United States Patent
AlKhoori

(10) Patent No.: US 9,136,752 B1
(45) Date of Patent: Sep. 15, 2015

(54) ELECTRICAL ENERGY REGENERATIVE SYSTEM, NETWORK AND METHOD

(71) Applicant: Sustainability Research & Development L.L.C., Dubai (AE)

(72) Inventor: Sawsan Mohammed Shuaib AlKhoori, Dubai (AE)

(73) Assignee: Sustainability Research & Development L.L.C., Dubai (AE)

( * ) Notice: Subject to any disclaimer, the term of this patent is extended or adjusted under 35 U.S.C. 154(b) by 0 days.

(21) Appl. No.: 14/267,136

(22) Filed: May 1, 2014

(51) Int. Cl.
*H02P 1/00* (2006.01)
*H02K 47/14* (2006.01)

(52) U.S. Cl.
CPC .................................... *H02K 47/14* (2013.01)

(58) Field of Classification Search
CPC ............................. H02P 7/34; Y02T 10/7005
USPC .................................. 318/139, 140, 151–153
See application file for complete search history.

(56) References Cited

U.S. PATENT DOCUMENTS

| | | | |
|---|---|---|---|
| 6,396,165 B1* | 5/2002 | Nagano et al. | 307/10.6 |
| 7,178,618 B2* | 2/2007 | Komeda et al. | 180/65.275 |
| 2006/0030450 A1* | 2/2006 | Kyle | 477/3 |
| 2010/0044129 A1* | 2/2010 | Kyle | 180/65.25 |

* cited by examiner

*Primary Examiner* — Rina Duda
(74) *Attorney, Agent, or Firm* — Raymond R. Ferrera; Adams and Reese LLP

(57) ABSTRACT

There is provided a closed-loop electrical energy regenerative system comprising (i) a regenerative electric motor for receiving a load of electrical energy for the purpose of conversion into kinetic energy; (ii) an alternator for generating an output load of electrical energy; (iii) a rotating shaft and at least one flywheel, the rotating shaft being configured to be connected to the regenerative electric motor, to the alternator and to the at least one flywheel for transferring a first portion of the kinetic energy from the regenerative electric motor to the alternator for the purpose of generating the output load of electrical energy and for transferring a second portion of the kinetic energy to the at least one flywheel for storage for the purpose of assisting in rotating the rotating shaft through subsequent cycles; (iv) a first electrical output for directing a first portion of the output load of electrical energy outside the system for consumption by an electric power system; and a second electrical output for directing a second portion of the output load of electrical energy back to the regenerative electric motor for operation through the subsequent cycles. There is also provided a closed-loop electrical energy regenerative network and method.

30 Claims, 9 Drawing Sheets

ELECTRICAL ENERGY REGENERATIVE SYSTEM, NETWORK AND METHOD

FIELD OF THE INVENTION

The present invention is generally related to electric generators and more particularly to a closed-loop electrical energy regenerative system, network and method.

BACKGROUND OF THE INVENTION

Electric motors are used in a wide range of industries for converting kinetic energy into electrical energy. Traditional electric generators convert all the kinetic energy received into electric energy for a subsequent use in various applications, regardless of the effective need of electrical energy of these applications and variation thereof through time. Traditional systems comprising electric motors are open loop systems using an input unit of energy to generate an output unit of energy. This generally results in an inefficient use of energy when used in applications having a fluctuation need of energy through time.

SUMMARY OF THE INVENTION

It is an object of the present invention to eliminate the disadvantages of the prior art by providing an electrical energy regenerative system, network and method.

As a first aspect of the invention, there is provided a closed-loop electrical energy regenerative system comprising:
- a regenerative electric motor for receiving a load of electrical energy for the purpose of conversion into kinetic energy;
- an alternator for generating an output load of electrical energy;
- a rotating shaft and at least one flywheel, the rotating shaft being configured to be connected to the regenerative electric motor, to the alternator and to the at least one flywheel for transferring a first portion of the kinetic energy from the regenerative electric motor to the alternator for the purpose of generating the output load of electrical energy and for transferring a second portion of the kinetic energy to the at least one flywheel for storage for the purpose of assisting in rotating the rotating shaft through subsequent cycles;
- a first electrical output for directing a first portion of the output load of electrical energy outside the system for consumption by an electric power system; and
- a second electrical output for directing a second portion of the output load of electrical energy back to the regenerative electric motor for operation through the subsequent cycles.

The system preferably further comprises a third electrical output for directing a third portion of the output load of electrical energy generated by the alternator to an electrical storage device for storage, the amount of the third portion being the difference between the total amount of the output load of electrical energy generated by the alternator and the sum of the first and second portions directed to the electric power system and the regenerative electric motor respectively.

The system preferably further comprises an electrical control panel comprising a microprocessor or a microcontroller, the electrical control panel being configured to be connected to the regenerative electric motor, to the alternator, to the electrical energy storage device and to the first, second and third electrical outputs.

The system preferably further comprises a starter electric motor configured to be connected to the rotating shaft for receiving an initial load of electrical energy from a power source sufficient for the rotation of the shaft and the operation of the alternator in a startup phase.

Preferably, the startup electric motor is configured to be connected to the power source through the electrical control panel, the electrical control panel being configured to switch off the starter electric motor from the power source once sufficient energy is fed into the system for operation through the subsequent cycles.

Preferably, the system further comprises a voltmeter configured to be connected to the electrical control panel for measuring the voltage of the output load of electrical energy generated by the alternator, wherein the ratio between the first and second portions are determined by the electrical control panel based on power measurements made by the system and power requirements criteria, the power measurements comprising the power of the generated output load of electrical energy as measured by the voltmeter, and the power requirements criteria comprising the amount of power required by the electric power system for consumption and the amount of power required by the regenerative electric motor for operation.

Preferably, the system further comprises a RPM meter configured to be connected to the electrical control panel and to the rotating shaft for measuring the rotational speed of the rotating shaft, wherein the power measurements considered by the electrical control panel for determining the first and second portions of the output load of electrical energy comprise the measured rotational speed of the rotating shaft.

Preferably, the system further comprises a pulley apparatus, the rotating shaft being configured to be connected to the alternator through the pulley apparatus for increasing the rotational speed of the alternator beyond the rotational speed of the rotating shaft.

Preferably, the electrical storage device is a battery.

Preferably, the power source used by the starter electric motor to receive an initial load of electrical energy is the battery.

Preferably, the system further comprises an Automatic Voltage Regulator (AVR) transformer and a DC rectifier transformer for transforming the third portion of electrical energy into suitable form for storage inside the battery.

Preferably, the system further comprises an AC transformer for transforming the second portion of electrical energy into suitable form for operating the regenerative electric motor.

Preferably, the AC transformer comprises a step-up transformer and a stabilizer transformer.

Preferably, the step-up transformer and stabilizer transformer are three phase transformers.

Preferably, the rotating shaft extends longitudinally along a longitudinal axis from a first end to a second end and is circular in cross section across the longitudinal axis.

Preferably, the at least one flywheel is three flywheels, a first flywheel, a second flywheel and a third flywheel, and the pulley apparatus comprises a first pulley having a first radius and a second pulley having a second radius smaller than the first radius.

Preferably, the first flywheel is located approximate the first end of the rotating shaft followed in the direction of the second end respectively by the regenerative electric motor, the second flywheel, the starter electric motor, the third flywheel, the first pulley, the second pulley and the alternator.

Preferably, the three flywheels have an identical weight and radius.

Preferably, each one of the three flywheels has a mass concentration approximate the in a predefined zone within its surface such that the net torque required for maintaining the rotation of the three flywheels when combined with a constant angular velocity about the longitudinal axis of the rotating shaft is null.

Preferably, the mass concentrations are of an identical density and volume located at 120 degrees of each other.

As a further aspect of the invention, there is provided a closed loop network comprising:
- a first mechanical network between a regenerative electric motor generating kinetic energy and an alternator for transferring at least a part of the kinetic energy to the alternator for the purpose of generating electrical energy and for storing the excess kinetic energy inside the first mechanical network;
- a first electrical network between the alternator and an electrical power system for transforming into a suitable form and transferring a first portion of the generated electrical energy for consumption by the electrical power system; and
- a second electrical network between the alternator and the regenerative electric motor for transforming into a suitable form and transferring a second portion of the generated electrical energy to the regenerative electric motor for operation.

Preferably, the network further comprises a third electrical network between the alternator and an electrical storage device for transforming into a suitable form and transferring a third portion of the generated electrical energy to the electrical storage device for storage.

Preferably, the network further comprises a second mechanical network between a starter electric motor generating an initial load of kinetic energy and the alternator for transferring at least a part of the initial load of kinetic energy to the alternator for the purpose of generating electrical energy and for storing the excess kinetic energy inside the second mechanical network.

Preferably, the first and second mechanical networks comprise a rotating shaft and at least one flywheel.

Preferably, the first mechanical network further comprises a pulley apparatus for increasing the rotational speed of the alternator beyond the rotational speed of the rotating shaft.

Preferably, the first electrical network comprises an AC step-up-transformer and an AC stabilizer transformer.

Preferably, the second electrical network comprises a DC AVR Transformer and a DC rectifier transformer.

Preferably, the first and second electrical networks comprise an electrical control panel comprising a microprocessor or microcontroller.

Preferably, the amounts of the first, second and third portions of electrical energy are determined by the electrical control panel.

Preferably, the first and second electrical networks comprise a voltmeter and an RPM meter for respectively monitoring the power of electrical energy generated by the alternator and rotational speed of the rotating shaft.

Preferably, the at least one flywheel are three flywheels, where each one of the three flywheels has a mass concentration approximate the in a predefined zone within its surface such that the net torque required for maintaining the rotation of the three flywheels when combined with a constant angular velocity about the longitudinal axis of the rotating shaft is null.

As a further further aspect of the invention, there is provided a closed-loop electrical energy regeneration method comprising:

In a first cycle:
- using an electric motor for generating kinetic energy;
- using at least a part of the kinetic energy for generating electrical energy using an alternator;
- storing the excess kinetic energy for use in subsequent cycles if required;
- using a first portion of the electrical energy generated by the alternator for operating an electrical power system; and in subsequent cycles:
- repeating the above steps of the first cycle using a second portion of the electrical energy generated by the alternator in the first cycle for feeding the electric motor.

Preferably, the method further comprises using a third portion of the electrical energy generated by the alternator for storage at an electrical energy storage device, the amount of the third portion being the difference between the total amount of electrical energy generated by the alternator and the sum of the first and second portions.

Preferably, the method further comprises monitoring the amount of electrical energy generated by the alternator and the excess amount of the kinetic energy stored; wherein the ratio between the first and second portions is determined at each cycle based on the amount of power required to operate the electrical power system, the monitored amount of electrical energy generated by the alternator and the stored excess amount of kinetic energy.

Preferably, the method further comprises: in the first and subsequent cycles, using the electrical energy stored in the electrical energy storage device for feeding up the electric motor if required.

DETAILED DESCRIPTION OF THE INVENTION

Figure 1:
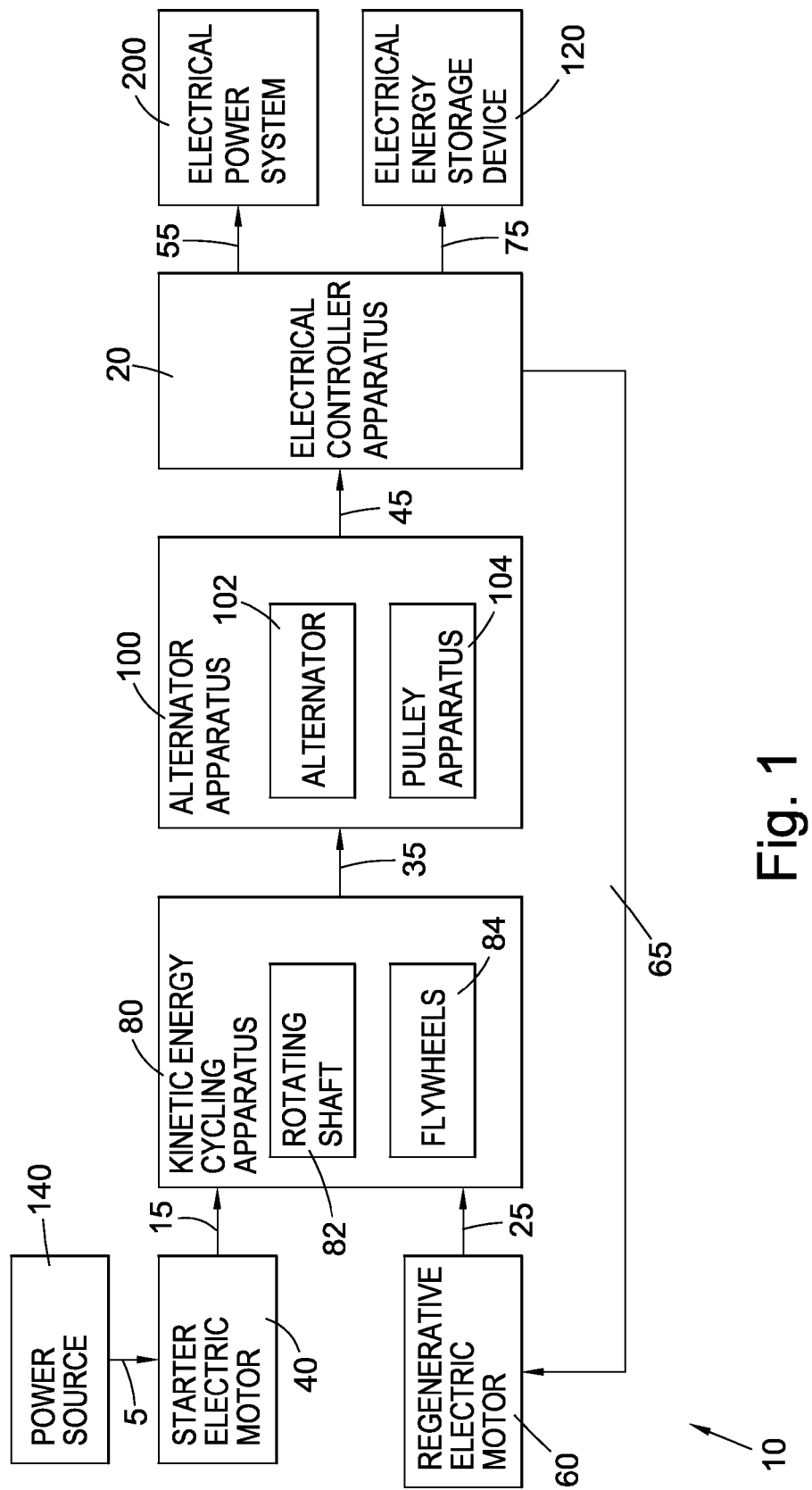
FIG. 1 is a bloc diagram illustrating a closed-loop electrical energy regenerative system according an embodiment of the present invention.
Figure 2:
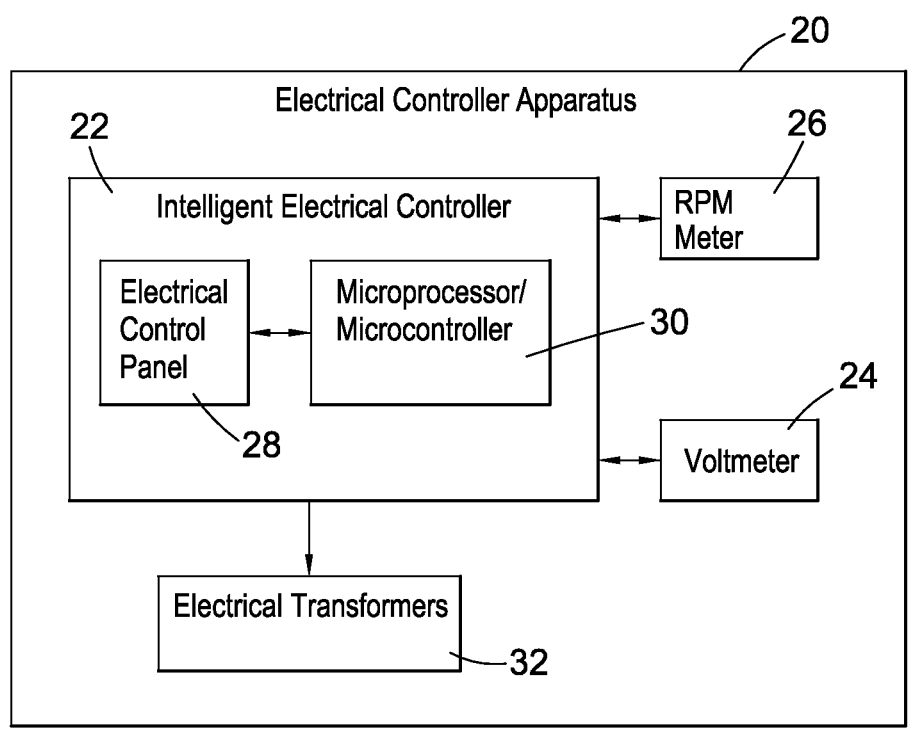
FIG. 2 is a bloc diagram illustrating an electrical controller apparatus according to a first embodiment of the present invention.

Referring to FIGS. 1 and 2, as a first aspect of the invention, there is provided an electrical energy regenerative system 10 comprising:

An electrical controller apparatus 20;

A starter electric motor 40;

A regenerative electric motor 60;

A kinetic energy cycling apparatus 80;

An alternator apparatus 100; and

An electrical energy storage device 120.

The electrical controller apparatus 20 is essentially the nervous system of the system 10 which coordinates its activities through the measurement, regulation, transformation and distribution of power obtained/distributed from/to the different components of the system 10 and/or external environment. The electrical controller apparatus 20 comprises an intelligent electrical controller 22 configured to be connected to the starter electric motor 40, to the regenerative electric motor 60, to the kinetic energy cycling apparatus 80, to the alternator apparatus 100 and to the electrical energy storage device 120. The intelligent electrical controller 22 is also configured to be connected to a power source 140 and to an electrical power system 200. The intelligent electrical controller 22 comprises an electrical control panel 28 and a microprocessor/microcontroller 30 configured to manage the operations of the system as explained below.

The electrical controller apparatus 20 is adapted to measure the amount of energy consumed and/or generated by these different components of the system 10 and to coordinate the activities of the system 10 in consequence. The electrical controller apparatus 20 further comprises a voltmeter 24, an RPM meter 26. The electrical controller apparatus 20 is configured to manage the activities of the system 10, including the measurement of different parameters of the system as well as the transformation and distribution of electricity generated by/directed to the system 10.

The power source 140 can be any source of electrical energy with sufficient power to start up the operation of the starter electric motor 40, for example a battery pack or a power supply. The power source 140 can originate from the electrical storage device 120 when the latter stores an initial amount of energy sufficient to start up the motor when required throughout the process. For example, the power source 140 and electrical storage device 120 can both consist of a battery pack.

The electrical controller apparatus 20 also comprises electrical transformers 32 and other electrical equipment for transforming the electrical energy into suitable forms of electrical energy, including but not limited to the regulation of the voltage of electrical currents when required.

The starter electric motor 40 is adapted to be connected to the electrical controller apparatus 20 and to the kinetic energy cycling apparatus 80. The starter electric motor 40 is adapted to be connected to the power source 140 through the electrical controller apparatus 20 which regulates the amount of electricity originating from the power source 140 required for starting up the starter electric motor 40. The starter electric motor 40 is configured to receive an initial amount of electrical energy 5 from the power source 140 sufficient for its operation. The starter electric motor 40 converts the initial amount of energy 5 received into kinetic energy 15 which is subsequently transferred to the kinetic energy cycling apparatus 80.

The kinetic energy cycling apparatus 80 is configured to be connected to the starter electric motor 40, to the regenerative electric motor 60, to the alternator apparatus 100 and to the electrical controller apparatus 20. At an initial stage, the energy cycling process of the kinetic energy cycling apparatus 80 is triggered by the starter electric motor 40 which converts the initial amount of electrical energy 5 received from the power source 140 into kinetic energy 15 which is then transferred to the kinetic energy cycling apparatus 80. At a second stage, the Kinetic energy cycling apparatus 80 transfers at least part of the kinetic energy generated by the starter electric motor 40 to the alternator apparatus 100 for operation. The electrical controller apparatus 20 measures the kinetic energy cycled by the kinetic energy cycling apparatus 80. This measurement is made based on the structure of the kinetic energy cycling apparatus 80. When the latter comprises a rotating shaft 82 (as in the example illustrated below), the rotational speed of the rotating shaft is measured using an RPM meter 26.

The kinetic energy cycling apparatus 80 essentially comprises mechanical components, such as a combination of a rotatable shaft 82 and flywheels 84, adapted to receive kinetic energy 15 & 25 from the starter electric motor 40 and the regenerative electric motor 60, to regulate the amount of kinetic energy for use in the course of a given energy cycling/regenerative iteration (also named a cycle), and to transfer the regulated amount of kinetic energy 35 to the alternator apparatus 100 for operation. The amount of kinetic energy 35 transferred to the alternator apparatus 100 is preferably the minimum amount of energy required to operate the alternator 102.

The remaining kinetic energy is stored within the mechanical components of the kinetic energy cycling apparatus 80 for re-use in the subsequent iterations (cycles). Consequently, the kinetic energy cycling apparatus 80 is adapted to store kinetic energy within its components when required which is used in subsequent iterations (cycles) throughout the iterative energy cycling/regenerative process.

The combination of a rotatable shaft 82 and flywheels 84 can be structured according to various configurations, the suitable configuration being based on the requirements of the application for which it is used.

When the amount of kinetic energy stored in the kinetic energy cycling apparatus 80 is lower than the threshold required for operating the alternator 102, the electrical controller apparatus 20 detects such lack of kinetic energy and directs a sufficient amount of electrical energy from the power source 140 and/or the electrical energy storage device 120 to the starter electric motor 40 for operation. The amount of initial load of electrical energy 5 directed to the starter electric motor 40 is preferably the minimum amount of energy required to cover for the lack of kinetic energy within the closed-loop cycling/regenerative process to keep the system 10 running.

The alternator apparatus 100 is adapted to be connected to the kinetic energy cycling apparatus 80 and to the electrical controller apparatus 20. The alternator apparatus 100 comprises an electrical alternator 102 for converting the kinetic energy transferred through the kinetic energy cycling apparatus 80 into electrical energy.

The alternator apparatus 100 can comprise a pulley apparatus 106 connected between the kinetic energy cycling apparatus 80 and the alternator 102 for regulating the rotational speed of the alternator 102. For example, the pulley apparatus 106 can have a first pulley 108 having a first radius and a second pulley 110 having a second radius smaller than the first radius. The first pulley 108 can be mechanically connected to the rotating shaft 82 and the second pulley 110 can be mechanically connected to the alternator shaft 104. The pulley apparatus 106 therefore uses the torque of the rotating shaft 82 for converting the rotational speed of the rotating shaft 82 into an increased rotational speed of the alternator shaft 104 when the rotational speed of the rotating shaft 82 is below the threshold required for operator the alternator 102 efficiently.

The electrical controller apparatus 20 divides the electrical energy generated by the alternator 102 into three portions, a first portion (electrical energy consumption portion) 55, a second portion (electrical energy cycling/regenerative portion) 65 and a third portion (electrical energy storage portion) 75. The electrical energy consumption portion 55 of the converted electrical energy is directed by the electrical controller apparatus 20 to the electrical power system 200 for consumption. The electrical energy cycling/regenerative portion 65 of the converted electrical energy is directed to the regenerative electric motor 60 for subsequent conversion into kinetic energy in order to be fed back to the kinetic energy cycling apparatus 80 for re-cycling. The electrical energy storage portion 75 of the converted electrical energy is directed by the electrical controller apparatus 20 to the electrical energy storage device 120 for storage.

The amounts of the first, second and third electrical energy portions 55, 65 & 75 are determined by the electrical controller apparatus 20 based on the amount of energy required to keep the system 10 running for the purpose of operating the alternator 102 for generating electricity and the amount of energy required by the electrical power system 200 for consumption. The remaining of the cycled/regenerated energy is directed to the electrical energy storage device 120 for storage. This determination is made by the electrical controller apparatus 20 by compiling the various measurements made in the course of process using the microprocessor/microcontroller 30. These measurements comprise the amount of kinetic energy present in the kinetic energy cycling/regenerative apparatus 80, the amount of energy required for consumption by the electrical power system 200 and the amount of energy generated by the alternator apparatus 100.

The regenerative electric motor 60 is adapted to be connected to the kinetic energy cycling apparatus 80 and to the electrical controller apparatus 20. The regenerative electric motor 60 receives electrical energy 65 generated by the alternator apparatus 100 through the electrical controller apparatus 20 and converts it into kinetic energy 35 which is subsequently transferred to the kinetic energy cycling apparatus 80. The kinetic energy cycling apparatus 80 receives the kinetic energy 35 from the regenerative electric motor 60 and transfers at least a part thereof to the alternator apparatus 100 for generating electrical energy. If required, a part of the kinetic energy might be stored in the flywheels 84 of the kinetic energy cycling apparatus 82 for use in subsequent iterations (cycles).

The alternator 102 converts the kinetic energy 35 received into electrical energy which is subsequently managed by the electrical controller apparatus 20 through which a first portion 55 is transferred to the electrical power system 200 for consumption, a second portion 65 is transferred back to the regenerative electric motor 60 to be used in the subsequent cycle/iteration for the purpose of generating kinetic energy 35 to be fed back to the kinetic energy cycling apparatus 80 for cycling, and a third portion 75 is transferred to the electrical energy storage device 120 for storage. This process is continued iteratively.

The system 10 is essentially a continuous closed loop (feedback) system where at least a part of the electricity generated by the system at the output of the alternator 102 is redirected to the system 100, as an input to the regenerative electric motor 60, for the purpose of cycling/regenerating this energy.

Figure 3A:
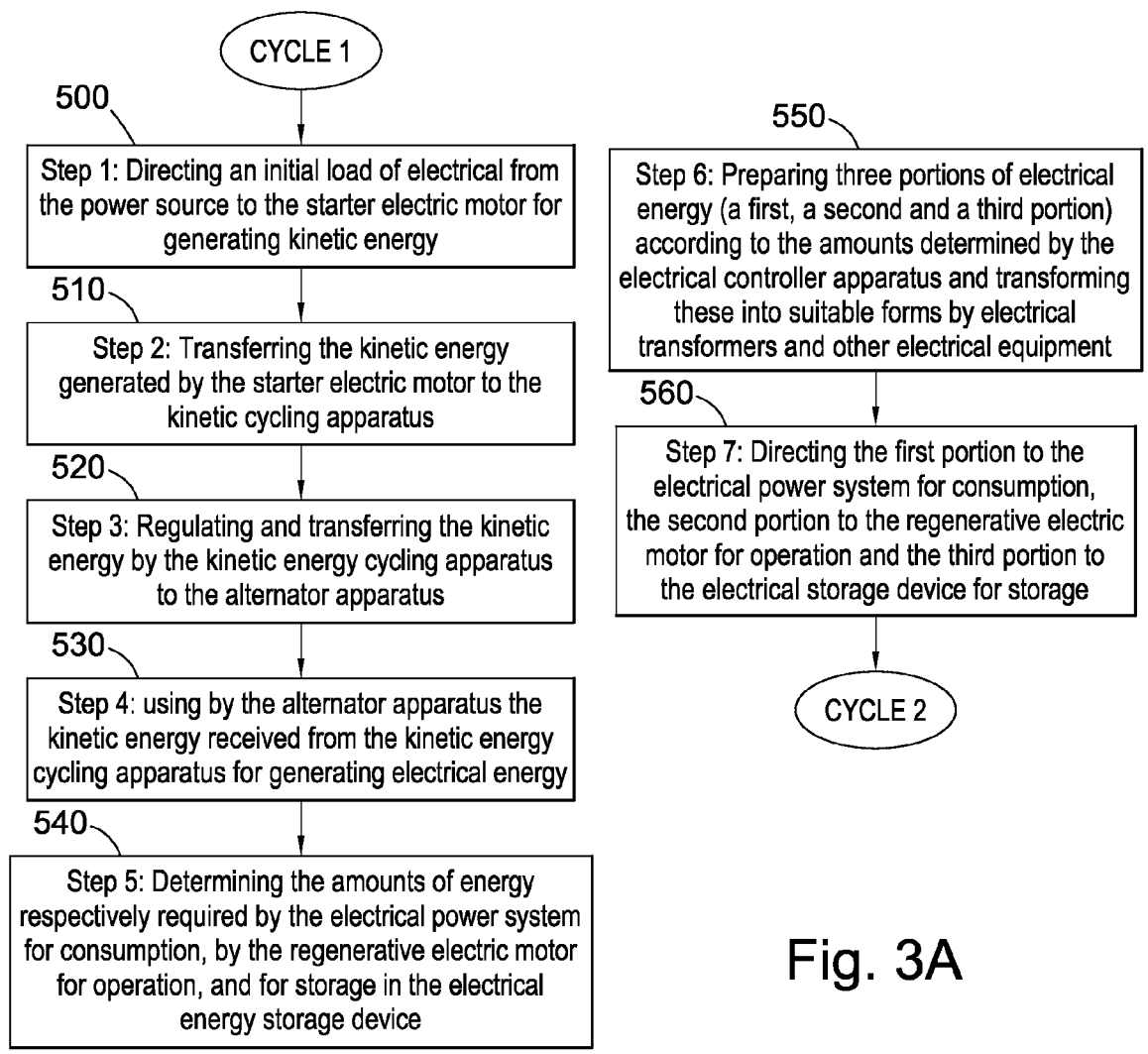
FIGS. 3A and 3B are flow charts illustrating a closed-loop electrical energy regeneration method according to a first embodiment of the present invention.
Figure 3B:
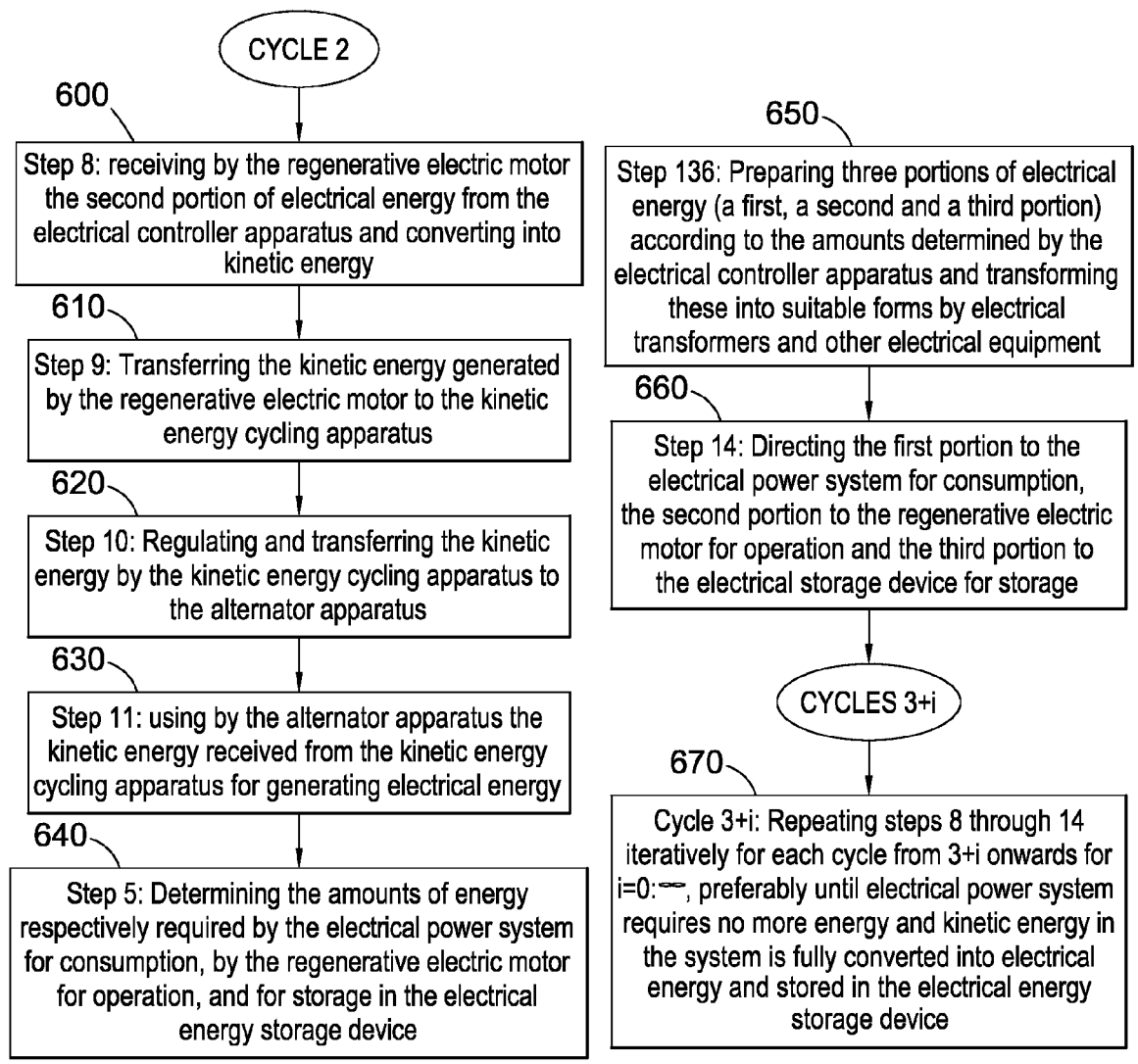

Referring to FIGS. 3A and 3B, from the functional perspective, the system 10 operates as follow.

At an initial stage 500 (step 1), the electrical controller apparatus 20 directs an initial amount of electrical energy from the power source 140 to the starter electric motor 40 for operation for the purpose of generating kinetic energy. The initial amount of electrical energy 5 should be sufficient to start up the starter electric motor 40 in order to generate a sufficient amount of kinetic energy required to operate the alternator 102. The starter electric motor 40 is switched off once the kinetic energy cycling apparatus 80 stores sufficient kinetic energy to operate the alternator 102.

At a second stage 510 (step 2), the kinetic energy generated by the starter electric motor 40 is transferred to the kinetic energy cycling apparatus 80.

At a third stage 520 (step 3), the kinetic energy cycling apparatus 80 regulates the kinetic energy and transfers the regulated energy 35 to the alternator apparatus 100. The kinetic energy cycling apparatus 80 is configured to regulate the amount of kinetic energy by using a suitable configuration and arrangement of the mechanical components within the apparatus 80 comprising the rotating shaft 82 and the flywheels 84.

The suitable configuration and arrangement takes into consideration the spatial configuration of these components (e.g. horizontal configuration or vertical configuration), the characteristic of the flywheels 84 (e.g. number, dimensions and weights), the characteristics of the rotating shaft 82 (e.g. dimensions, material), and type of mechanical connections between the apparatus 80 and the other components, including the starter electric motor 40, the regenerative electric motor 6 and the alternator 100.

The kinetic energy cycling apparatus 80 is therefore configured to have suitable configuration and technical specificities based, among others, on the desired performance of the system 10, including the desired rotational speed of the rotating shaft 82, the desired maximum amount of energy for storage within the flywheels 84 for use in subsequent cycles/iterations, and the power/amount of electrical energy desired for generation by the alternator 102.

The alternator apparatus 100 is configured for subsequently transferring the regulated kinetic energy to the alternator 102 for operation. When the kinetic energy present in the Kinetic energy cycling apparatus 80 exceeds the amount of kinetic energy required for the operation of the alternator, the exceeding amount of kinetic energy is stored within the components, particularly the flywheels 84, of the Kinetic energy cycling apparatus 80.

At a fourth stage 530 (step 4), the alternator apparatus 100 uses the kinetic energy received 35 for generating electrical energy 45 which is directed to the electrical controller apparatus 20 for management.

At a fifth stage 540 (step 5), the electrical controller apparatus 20 determines the amount of electrical energy required for operating the electrical power system 200 and the amount of electrical energy required to be fed back to kinetic energy cycling apparatus 80 for keeping the alternator 102 running at its functional range. The excess power amount would be stored in the electrical energy storage device 120.

The determination of the amounts of energy respectively for each one of the first, second and third portions is based on measurements, preferably in real time, made by the electrical controller apparatus 80. These measurements comprise the amount of kinetic energy present in the kinetic energy cycling apparatus 80 and/or the amount of energy generated by the alternator 102. These measurements are normally taken using the RPM meter 26 and the voltmeter 24 for respectively measuring the RPM of the rotating shaft 82 and of the output current of the alternator 102. When the amount of energy required by the electrical power system 200 for consumption varies with time, these measurements also comprise measurements (preferably in real time) of the amount of energy required by the electrical power system 200.

At a sixth stage 550 (step 6), once the amounts are determined, the electrical energy generated is divided into three portions, a first portion, a second portion and a third portion. These three portions of electrical energy are transformed by suitable electrical transformers 32 and other electrical equipment as required into suitable forms of electrical energy.

At a seventh stage 560 (step 7), the transformed portions 55, 65 & 75 are transferred respectively to the electrical power system 200 for consumption, to the regenerative electric motor 60 for operation, and to the electrical energy storage device 120 for storage.

Cycle/iteration 2 begins at the eighth stage 600 (step 8), when the regenerative electric motor 60 receives the second portion of electrical energy 65 from the electrical controller apparatus 20 and converts said energy 65 into kinetic energy.

At a night stage 610 (step 9), the regenerative electric motor 60 transfers the kinetic energy generated 25 to the kinetic energy cycling apparatus 80.

At the 10$^{th}$ stage 620 (step 10), the kinetic energy cycling apparatus 80 regulates the kinetic energy received and transfers the regulated kinetic energy 35 to the alternator apparatus 100 for operating the alternator 102. The exceeding amount, if any, is stored in the kinetic energy cycling apparatus 80 as explained above.

At an 11$^{th}$ stage 630 (step 11), the alternator 102 receives the regulated kinetic energy 45 from the kinetic energy cycling apparatus 80 and converts it into electrical energy.

At the 12$^{th}$ stage 640 (step 12), the electrical controller apparatus 20 measures the amount of electrical energy generated by the alternator 102, determines the amounts/forms of the electrical energy consumption portion 55, the electrical energy cycling/regenerative portion 65 and the electrical energy storage portion 75.

At the 13$^{th}$ stage 650 (step 13), the electrical controller apparatus 20 prepares the three portions and conducts the required electrical transformations of said portions using suitable electrical transformers 32 and other electrical equipment (such as inverters for example).

This determination is based on measurements (preferably in real time) made by the electrical controller apparatus of the amounts of energy stored/consumed/generated by the different components of the system 10 and/or the external environment, for example the power source 140 and/or the electrical power system 200.

Where the amount of energy required for the kinetic energy cycling apparatus 80 exceeds the amount of energy available, the electrical controller apparatus 20 determines and directs a sufficient amount of electrical energy 5 from the power source 140 and/or the electrical energy storage device 120 to the starter electric motor 40 for operation. This sufficient amount of electrical energy directed to the starter electric motor 40 is also determined by the electrical controller apparatus 20 based on the different measurements obtained in course of process.

At the 14$^{th}$ stage 660 (step 14), the electrical controller apparatus 20 directs the three portions 55, 65 & 75 respectively to the electrical power system 200, to the regenerative electric motor 60 and to the electrical energy storage device 120.

Subsequently, steps 8 to 14 are repeated through an iterative process. Theoretically speaking, this iterative process can be repeated indefinitely. This can continue on until the electrical power system 200 requires no more energy and the amount of kinetic energy stored in the kinetic energy cycling apparatus 80 is fully converted into electrical energy and stored in the electrical energy storage device 120 and/or consumed by the electrical power system 200.

When the system 10 requires extra energy to operate, the electrical controller apparatus 20 detects such a need thorough the continuous monitoring of the amount of electrical energy generated by the alternator 102, the amount of kinetic energy within the kinetic energy cycling apparatus 80 and the amount of electrical energy stored in the electrical energy storage device 120. If the sum of these different energy components is not sufficient for the operation of the system 10, the electrical controller apparatus 20 directs electrical energy to the starter electric motor 40 from the power source 140. In this case, the steps of cycle 1 are conducted using this extra energy, followed by the subsequent cycles 2 onwards as detailed above.

Example of Implementation

The below illustrates an example of implementation of an electrical energy regenerative system 10 in accordance with one embodiment of the present invention.

A person skilled in the art should appreciate that the specific dimensions, components and configurations present in this example are presented for illustrative purposes only and are not intended to limit the scope of this invention beyond the limits of the claims and the system architecture and process as explained in the section above. The dimensions, capacities and configurations can be varied by a person skilled in the art without departing from the scope of the present invention based on the requirements of the application for which such a system/process is used.

Referring to FIGS. 4 to 9, there is provided an electrical energy regenerative system 10 comprising an electrical control panel 28, a PC manager 34, a PC box controller 36 comprising a microprocessor 30, an RPM and voltage meter 24/26, a starter electric motor 40, a cycling (regenerative) electric motor 60, an alternator 102, a pulley apparatus 104, a rotating shaft 82, flywheels 84 & 86 & 88, an AC transformer 44, an AVR transformer 46, a DC rectifier transformer 48 and a battery 122.

Figure 4:
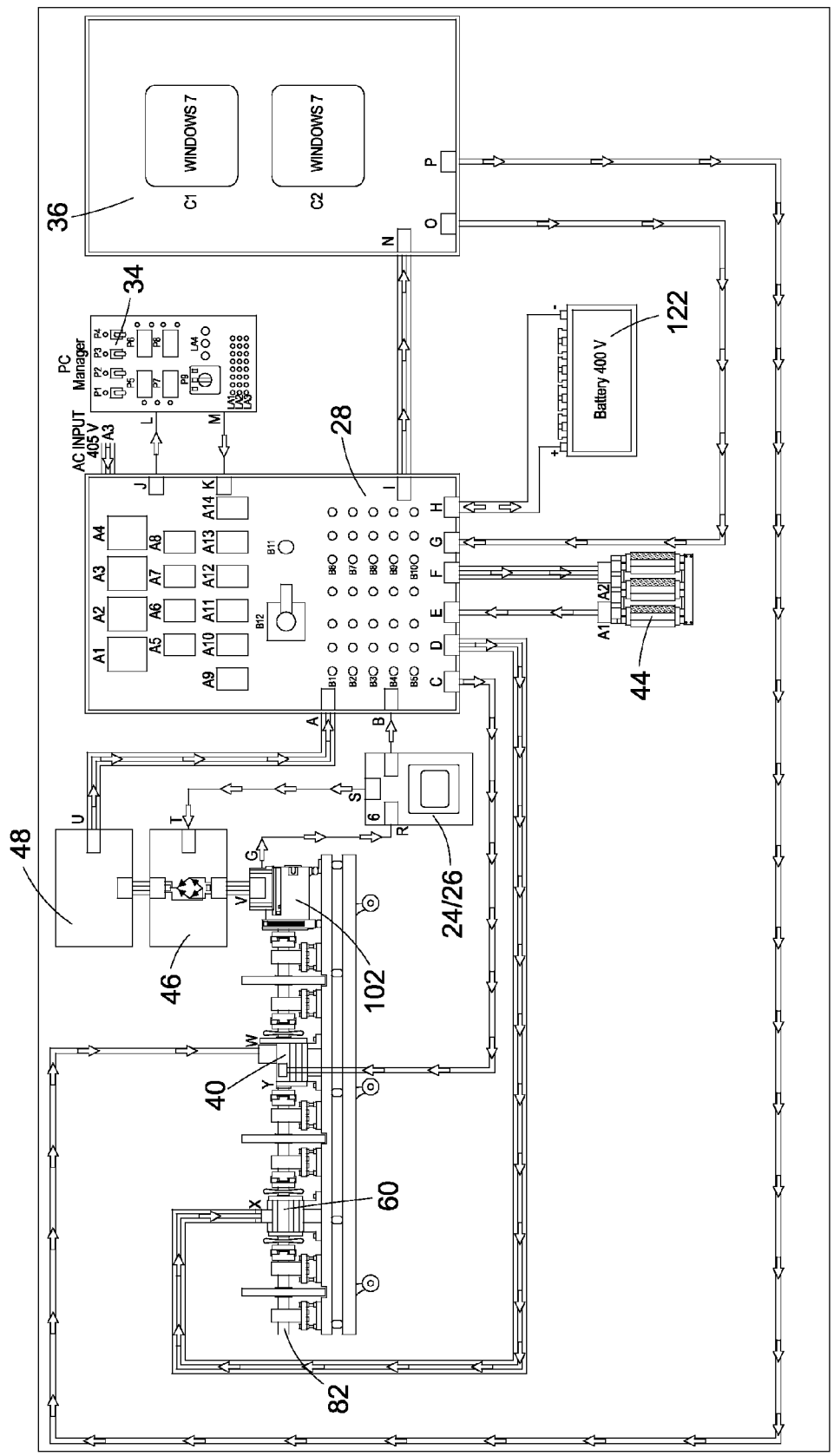
FIG. 4 is a schematic diagram illustrating an electrical energy regenerative system in accordance with an embodiment of the present invention.

As illustrated in FIG. 4, in this example, the electrical controller apparatus 20 comprises the electrical control panel 28, the PC manager 34, the PC box controller 36, the RPM and voltage meter 24/26, the AC transformer 44, the AVR transformer 46 and the DC rectifier transformer 48. The Kinetic energy cycling apparatus 80 comprises the rotating shaft 82 and the flywheels 84 & 86 & 88. The alternator apparatus 100 comprises the alternator 102 and the pulley apparatus 104. The electrical energy storage device 120 comprises the battery 122.

Figure 5:
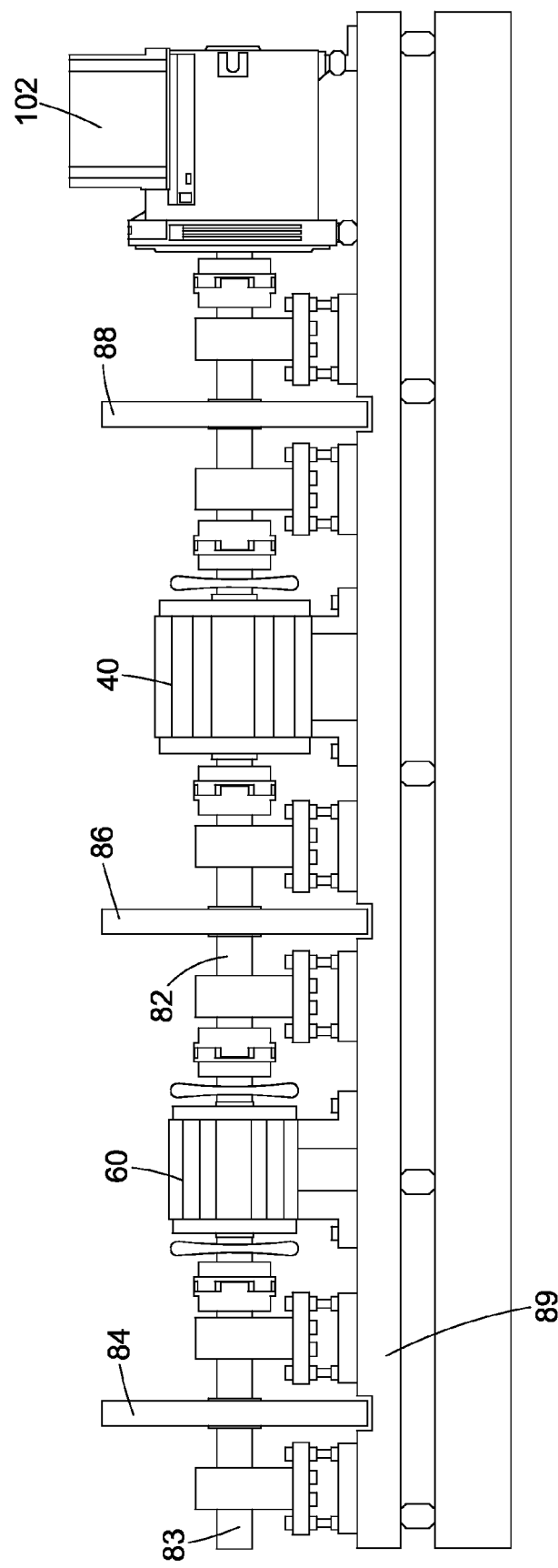
FIG. 5 shows a kinetic energy cycling apparatus connected to the starter electric motor, the regenerative electric motor and the alternator in accordance with an embodiment of the present invention.

As illustrated in FIG. 5, the starter electric motor, the regenerative electric motor 60, the rotating shaft 82, the flywheels 84 & 86 & 88 and the alternator 102 are mounted in a stationary position.

The starter electric motor 40 is a 13.4 Horse Power DC motor operating at 400 volts, 40 Amperes and 1570 RPM. The starter electric motor 40 comprises a 3-point DC Starter and field regulator for speed control. The starter electric motor 40 is a horizontal foot mounted type, continuously rated, self ventilated dynamically balanced and has E/B class Insulation. The starter electric motor 40 is coupled through flexible coupling to a fabricated M. S. Channel iron base plate.

The starter electric motor 40 is electrically connected to the electrical control panel 28 and mechanically connected to the rotating shaft 82. The electrical control panel 28 is electrically connected, among others, to the PC manager 34, to the PC box controller 36 and to the battery 122. The starter electric motor 40 receives an initial load of electrical energy 5 from the battery 122 or another external power source and instructions 7 from the PC Box Controller 36 to start operation.

Figure 6:
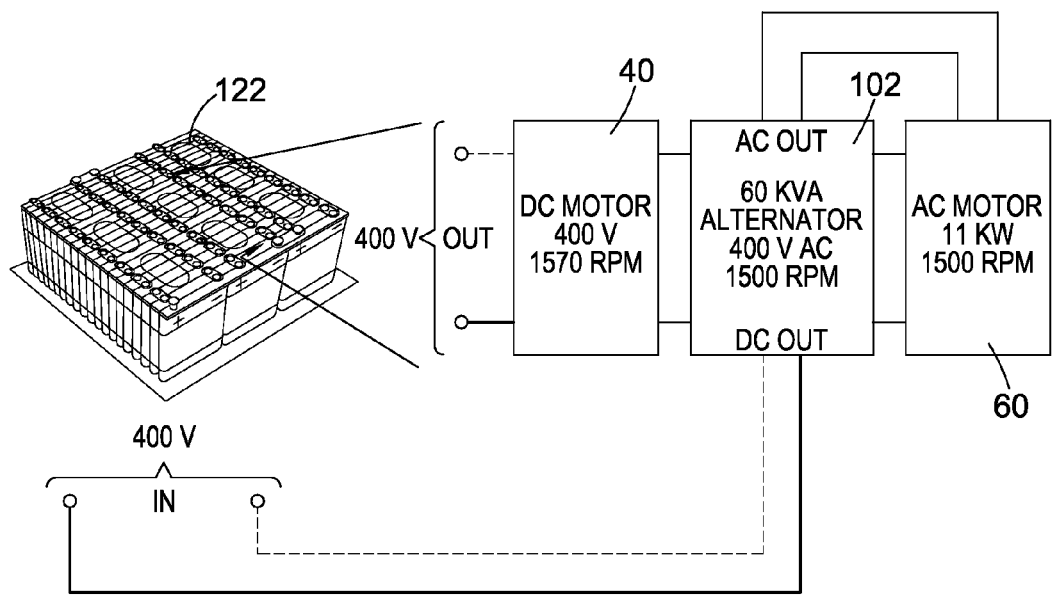
FIG. 6 illustrates a closed-loop circuit between a starter electric motor, a regenerative electric motor, an alternator and a battery in accordance with an embodiment of the present invention.

As illustrated in FIG. 6, the electric power provided to the starter electric motor 40 can come from an alternating current (AC) external power source and/or a direct current (DC) battery source via-power line.

The PC Box Controller 36 instructs the electrical control panel 28 to obtain an initial load of electrical energy 5 from the battery 122 and to transition the load 5 to the starter electric motor 40 at the start up stage. This initial load of electrical energy 5 is transitioned through the electrical control panel 28. The PC manager 34 is configured to manage the electrical control panel from a computer device (not shown). The starter electric motor 40 converts the electrical energy received into kinetic energy 15 which is used to rotate the rotating shaft at about 1500-2500 RPM.

The rotating shaft 82 is mechanically connected to the alternator 102 for converting the kinetic energy 35 transferred to the alternator 102 into electrical energy. The rotating shaft 82 extends longitudinally along a longitudinal axis from a first end 83 to a second end (not shown). The rotating shaft 82 is configured to be mechanically connected to the starter electric motor 40, to the regenerative electric motor 60 and to the alternator 102. The regenerative electric motor 60, the starter electric motor 40 and the alternator 102 are respectively located along the longitudinal axis of the rotating shaft 82 between the first end 83 and the second end (not shown). The rotating shaft 82 has preferably a circular cross section in the direction perpendicular to the longitudinal axis. Preferably, the rotating shaft 82 is around 3.6 meters in length along the longitudinal axis and 9 cm in diameter along the circular cross section.

The flywheels 84 & 86 & 88 are configured to be mechanically connected to the rotating shaft 82. The flywheels 84 & 86 & 88 are three in number, but this can vary according to the requirements of the application. The flywheels 84 & 86 & 88 are configured to be rotatable about the longitudinal axis of the rotating shaft 82. The first flywheel 84 is adapted to be mounted on the rotating shaft 82 between the rotating shaft first end 83 and the regenerative electric motor 60. The second flywheel 86 is adapted to be mounted on the rotating shaft 82 between the regenerative electric motor 60 and the starter electric motor 40. The third flywheel 88 is adapted to be mounted on the rotating shaft 82 between the starter electric motor 40 and the alternator 102.

The first, second and third flywheels 84 & 86 & 88 preferably comprise 150, 148 and 140 teeth respectively. Each one of the flywheels 84 & 86 & 88 preferably has a mass concentration in a predefined zone within its surface such that the net torque required for maintaining the rotation of the three flywheels when combined with a constant angular velocity about the longitudinal axis of the rotating shaft 82 is null. Preferably, the mass concentrations of the flywheels 84 & 86 & 88 are of an identical density and volume located at 120 degrees of each other. The mass concentrations are preferably 10 Kg each. The dimensions of the flywheels 84 & 86 & 88 are preferably identical having a radius of 50 cm each.

The flywheels 84 & 86 & 88 store a first portion of the kinetic energy and transfer a second portion of the kinetic energy 35 to the rotating shaft 82 and subsequently to the alternator 102 for operation. The stored kinetic energy is the excess of what is required to rotate the rotating shaft 82 at around 1500-2500 RPM. The kinetic energy stored in the flywheels 84 & 86 & 88 is used in subsequent cycles as explained below.

The electric alternator 102 can either be an AC or DC alternator. A converter can also be used to change DC to AC or vice versa A first output (DC output) of the alternator 102 is electrically connected to the AVR transformer 46 which is connected to the DC rectifier transformer 48. A second output (AC output) of the alternator 102 is connected to the electrical control panel 28 which is connected to the AC transformer 44. The alternator 102 generates an electrical current comprising two portions, a DC current portion and an AC current portion. The AC current portion is directed to the AC transformer 44 via the electrical control panel 28. The DC current portion is directed to the AVR transformer 46 and subsequently to the DC rectifier transformer 48.

Figure 7:
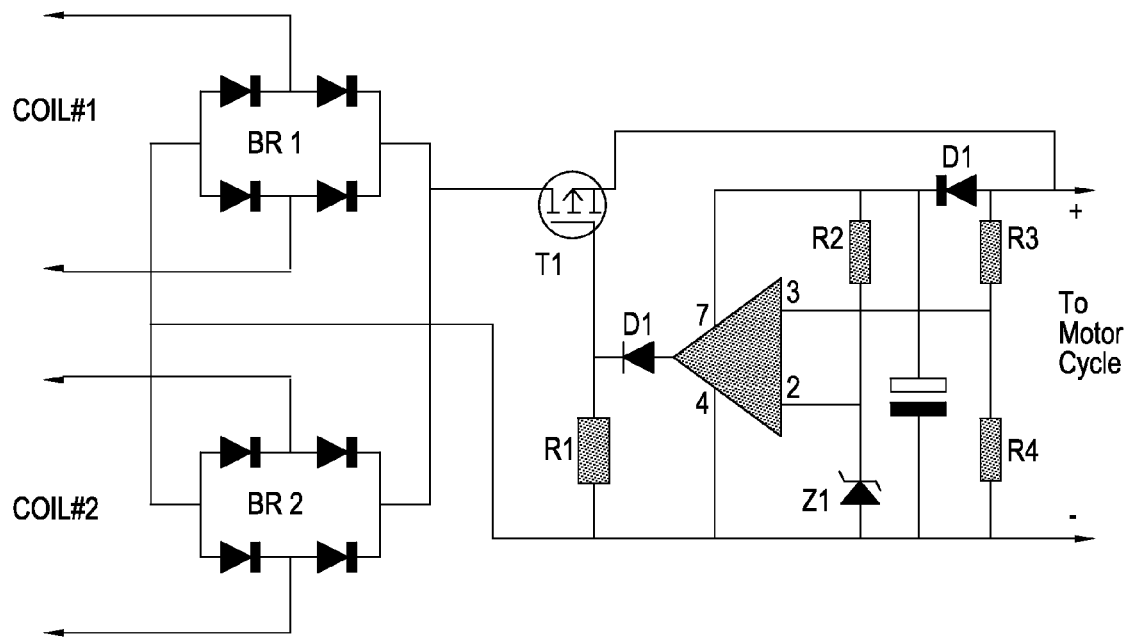
FIG. 7 is an electrical schematic illustrating the electronics of an AC alternator in accordance with an embodiment of the present invention.
Figure 8:
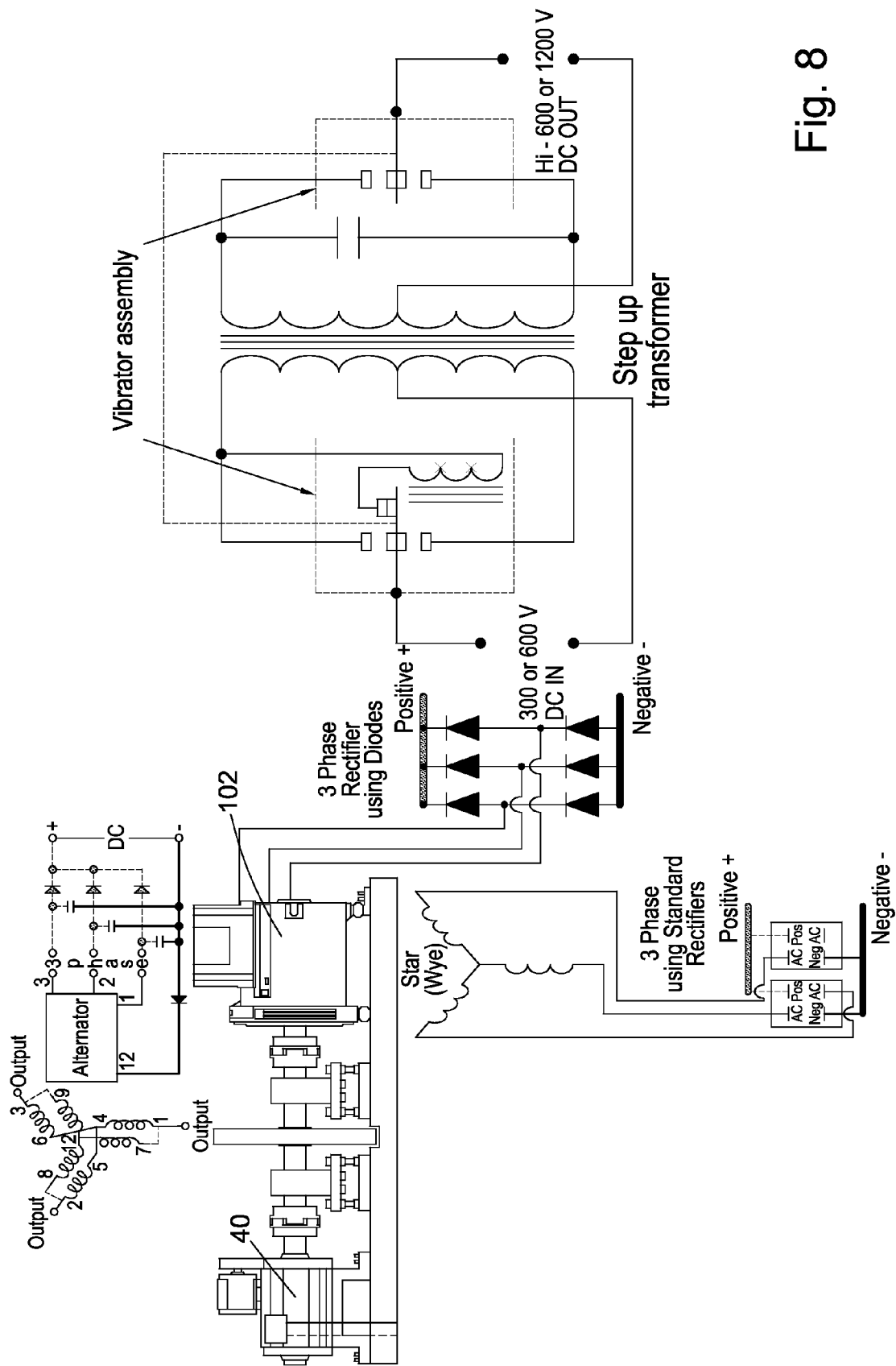
FIG. 8 is a schematic illustrating the electrical outputs of an alternator in accordance with an embodiment of the present invention.
Figure 9:
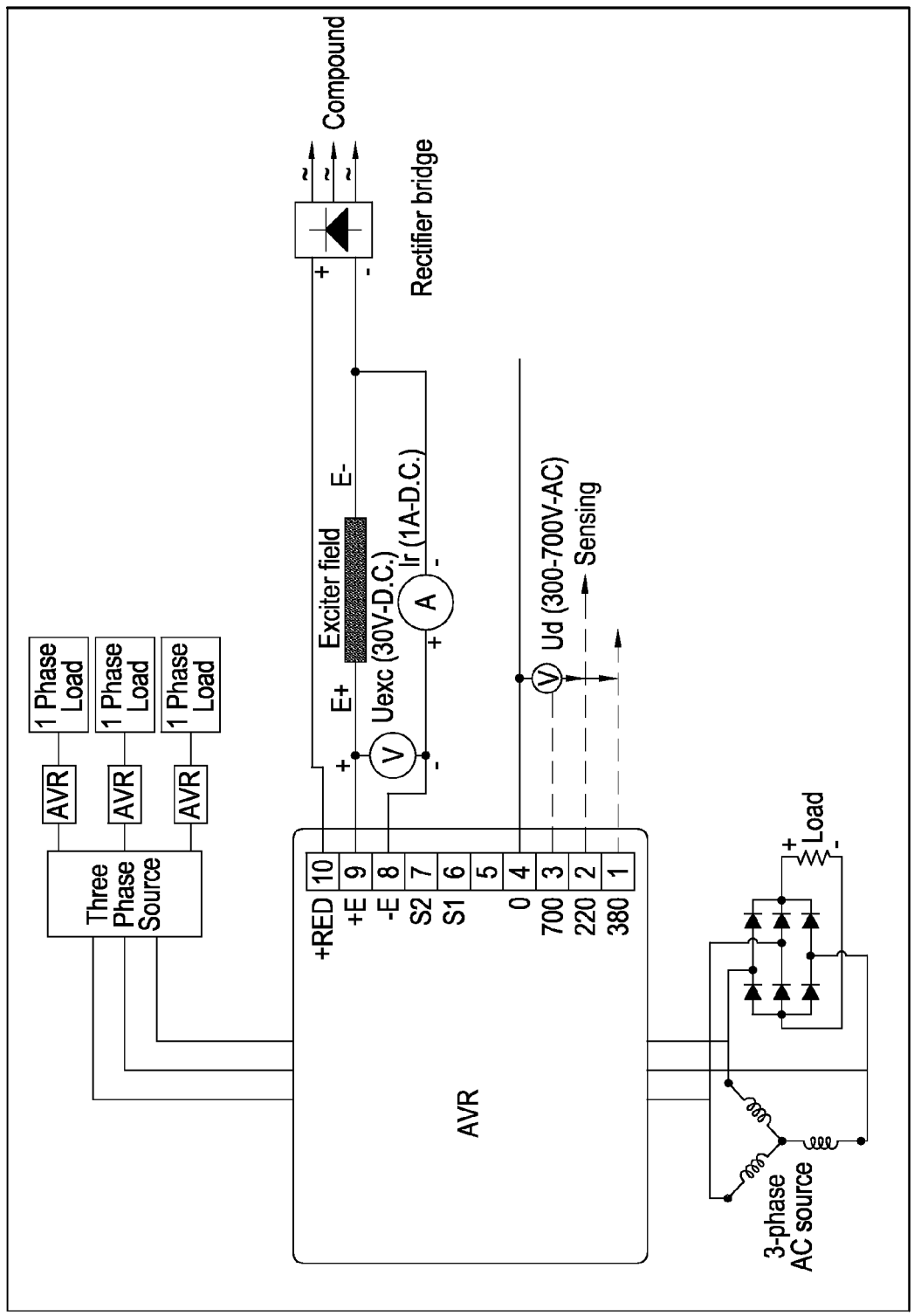
FIG. 9 is an electrical schematic illustrating the electronics of an AVR transformer in accordance with an embodiment of the present invention.

FIG. 7 illustrates the AC inputs and outputs of the AC transformer 44. FIG. 8 illustrates the electrical outputs of the alternator 102. FIG. 9 illustrates the electronics of the AVR transformer 46.

The alternator 102 is a preferably a synchronous alternator armature with 3 phases, 4 poles distributed type, double layer wound having slip rings. The synchronous alternator 102 will be suitable to generate 440V, 3Phase, 4wire AC 50 cycle supply at synchronous speed of 1500 rpm. The alternator capacity is 60 Kilovolt ampere (Kva). The alternator 102 is a horizontal foot mounted type, continuously rated, self ventilated dynamically balanced and has EB class Insulation. The alternator 102 is coupled through flexible coupling to a fabricated M. S. Channel iron base plate 89.

The pulley apparatus 104 is mechanically connected to the rotating shaft 82 and to the alternator 102. The pulley apparatus 104 is used for regulating the rotational speed of the alternator 102 based on the kinetic energy 35 received through the rotating shaft 82. When the rotational speed of the rotating shaft 82 is lower than the threshold required for operating the alternator 102, the pulley apparatus 104 is configured to increase the rotational speed of the alternator 102 in order to enable the alternator 102 to operate appropriately. The rotational speed of the alternator in this example should be in the range of 1500-2500 RPM.

The pulley apparatus 104 comprises a first pulley having a first radius and a second pulley have a second radius. The first radius is bigger than the second radius. The first pulley is mechanically connected to the rotating shaft 82, whereas the second pulley is mechanically connected to the shaft of the alternator 102. The pulley apparatus 104 allows for regulating the rotational speed of the alternator shaft within the range of 1500-2500 RPM.

At the AC output of the alternator 102, the AC current portion is at 3 phases, each phase being AC 90 Amperes, 405 volts, 50 Hertz. The AC current portion generated by the alternator 102 is directed to the AC transformer 44 through the electrical control panel 28 for transformation into AC 40 Amperes, 405 volts, 50 Hertz. The AC transformer 34 preferably comprises a first AC transformer and a second AC transformer. The first AC transformer is preferably a MOSFIT transformer which is configured to transform the AC current generated by the alternator into AC 40 Amperes, 600 volts, 50 Hertz. The first AC transformer is adapted to be connected to the second AC transformer. The AC current outputted from the first AC transformer is directed to the second AC transformer for stabilizing the current at AC 40 Amperes, 405 volts, 50 Hertz. The second AC transformer is adapted to be connected to the regenerative electric motor 60 through the electrical control panel 28.

At the DC output of the alternator 102, the DC current portion is initially at DC 90 Amperes, 600 volts. The DC current portion generated by the alternator 102 is firstly directed to the DC rectifier transformer 38 for transformation into DC 90 Amperes, 400 volts. The DC rectifier transformer 38 is configured to be connected to the battery 122 through the electrical control 28. The DC current outputted from the DC rectifier transformer 38 is transferred for storage inside the battery 122.

The regenerative electric motor 60 receives electrical energy 65 from the AC transformer 44 and converts it into kinetic energy 25. The regenerative electric motor 60 is mechanically connected to the rotating shaft 82. The kinetic energy 25 generated by the regenerative electric motor 60 is used to rotate the rotating shaft 82 at around 1500-2500 RPM. The rotating shaft 82 being mechanically connected to the shaft of the alternator 102, the rotation of the rotating shaft 82 induces the rotation of the shaft of the alternator 102 for operating the alternator 102 for the purpose of generating electrical energy.

A first portion of the generated electrical energy 55 is directed by the electrical control panel 28 to an electrical power system 200 for consumption after appropriate transformation. A second portion of the generated electrical energy 65 is transferred back to the regenerative electric motor 60 for cycling after appropriate transformation by the AC transformer 34 as explained above. A third portion of the electrical energy 75 generated by the alternator 102 is transferred to the battery 122 for storage through the electrical control panel 28 after appropriate transformation as detailed above.

The ratio between the first portion 55, the second portion 65 and the third portion 75 is determined by the PC BOX Controller 36 based on the needs of the electrical power system 200 and on the amount of energy required to keep the rotating shaft 82 rotating at around 1500-2500 RPM. In order to assess these, the PC manager 34 and/or the PC box controller 36 monitor, among others, the rotational speed of the rotating shaft 82 and the voltage of the current at the output of the alternator 102. Measurements of the rotational speed of the rotating shaft 82 and of the voltage of the alternator 102 current output are preferably made in real time using an RPM and voltage meter 24/26 connected to the rotating shaft 82, the alternator 102 and to the electrical control panel 28 (which is connected to the PC manager 34).

When the system does not contain enough energy to keep the rotating shaft 82 rotating at around 1500-2500 RPM, the PC box controller 36 and/or the PC manager 34 instructs the electrical control panel 28 to direct a load of electrical energy from the battery 122 to the starter electric motor 40 for operation. The battery 122 is DC 400 volts, 2000 amperes. The starter electric motor 40 converts the electrical energy received into kinetic energy 15 which is used to rotate the rotating shaft 82. The starter electric motor 40 is turned off after converting the required load into kinetic energy. The load amount is determined by the PC box controller 36.

This process is continued iteratively through time.

Although the above description of the present invention has disclosed the features of the invention as applied to the preferred embodiment; additions, omissions and modifications applied to the details of the embodiment illustrated may be made by those skilled in the art without departing from the essential characteristic of the present invention.

The invention claimed is:

1. A closed-loop electrical energy regenerative system comprising:
   a regenerative electric motor for receiving a load of electrical energy for the purpose of conversion into kinetic energy;
   an alternator for generating an output load of electrical energy;
   a rotating shaft and at least one flywheel, the rotating shaft being configured to be connected to the regenerative electric motor, to the alternator and to the at least one flywheel for transferring a first portion of the kinetic energy from the regenerative electric motor to the alternator for the purpose of generating the output load of electrical energy and for transferring a second portion of the kinetic energy to the at least one flywheel for storage for the purpose of assisting in rotating the rotating shaft through subsequent cycles; and
   a first electrical output for directing a first portion of the output load of electrical energy outside the system for consumption by an electric power system; and
   a second electrical output for directing a second portion of the output load of electrical energy back to the regenerative electric motor for operation through the subsequent cycles.

2. The system as claimed in claim 1 further comprising:
   a third electrical output for directing a third portion of the output load of electrical energy generated by the alternator to an electrical storage device for storage, the amount of said third portion being the difference between the total amount of the output load of electrical energy generated by the alternator and the sum of the first and second portions directed to the electric power system and the regenerative electric motor respectively.

3. The system as claimed in claim 2 further comprising an electrical control panel comprising a microprocessor or a microcontroller, the electrical control panel being configured to be connected to the regenerative electric motor, to the alternator, to the electrical energy storage device and to the first, second and third electrical outputs.

4. The system as claimed in claim 3 further comprising a starter electric motor configured to be connected to the rotating shaft for receiving an initial load of electrical energy from a power source sufficient for the rotation of the shaft and the operation of the alternator in a startup phase.

5. The system as claimed in claim 4, wherein said startup electric motor is configured to be connected to the power source through the electrical control panel, the electrical control panel being configured to switch off said starter electric motor from the power source once sufficient energy is fed into the system for operation through the subsequent cycles.

6. The system as claimed in claim 5 further comprising a voltmeter configured to be connected to the electrical control panel for measuring the voltage of the output load of electrical energy generated by the alternator, wherein the ratio between the first and second portions of the output load of electrical energy are determined by the electrical control panel based on power measurements made by the system and power requirements criteria, the power measurements comprising the power of the generated output load of electrical energy as measured by the voltmeter, and the power requirements criteria comprising the amount of power required by the electric power system for consumption and the amount of power required by the regenerative electric motor for operation.

7. The system as claimed in claim 6 further comprising a RPM meter configured to be connected to the electrical control panel and to the rotating shaft for measuring the rotational speed of the rotating shaft, wherein the power measurements considered by the electrical control panel for determining the first and second portions of the output load of electrical energy comprise the measured rotational speed of the rotating shaft.

8. The system as claimed in claim 7 further comprising a pulley apparatus, the rotating shaft being configured to be connected to the alternator through the pulley apparatus for increasing the rotational speed of the alternator beyond the rotational speed of the rotating shaft.

9. The system as claimed in claim 8, wherein said electrical storage device is a battery, and wherein the power source used by the starter electric motor to receive an initial load of electrical energy is the battery, said system further comprising an Automatic Voltage Regulator (AVR) transformer and a DC rectifier transformer for transforming the third portion of electrical energy into suitable form for storage inside the battery.

10. The system as claimed in claim 9, further comprising an AC transformer for transforming the second portion of electrical energy into suitable form for operating the regenerative electric motor.

11. The system as claimed in claim 10 wherein said AC transformer comprises a three phase step-up transformer and a three phase stabilizer transformer.

12. The system as claimed in claim 11, wherein the rotating shaft extends longitudinally along a longitudinal axis from a first end to a second end and is circular in cross section across the longitudinal axis.

13. The system as claimed in claim 12, wherein the at least one flywheel is three flywheels, a first flywheel, a second flywheel and a third flywheel, and the pulley apparatus comprises a first pulley having a first radius and a second pulley having a second radius smaller than the first radius, wherein the first flywheel is located approximate the first end of the rotating shaft followed in the direction of the second end respectively by the regenerative electric motor, the second flywheel, the starter electric motor, the third flywheel, the first pulley, the second pulley and the alternator.

14. The system as claimed in claim 13, wherein the three flywheels have an identical weight and radius, wherein each one of the three flywheels has a mass concentration approximate the in a predefined zone within its surface such that the net torque required for maintaining the rotation of the three flywheels when combined with a constant angular velocity about the longitudinal axis of the rotating shaft is null.

15. The system as claimed in claim 14 wherein said mass concentrations are of an identical density and volume located at 120 degrees of each other.

16. A closed loop network comprising:
a first mechanical network between a regenerative electric motor generating kinetic energy and an alternator for transferring at least a part of the kinetic energy to the alternator for the purpose of generating electrical energy and for storing the excess kinetic energy inside the first mechanical network;
a first electrical network between the alternator and an electrical power system for transforming into a suitable form and transferring a first portion of the generated electrical energy for consumption by the electrical power system; and
a second electrical network between the alternator and the regenerative electric motor for transforming into a suitable form and transferring a second portion of the generated electrical energy to the regenerative electric motor for operation.

17. The network as claimed in claim 16 further comprising a third electrical network between the alternator and an electrical storage device for transforming into a suitable form and transferring a third portion of the generated electrical energy to the electrical storage device for storage.

18. The network as claimed in claim 17 further comprising a second mechanical network between a starter electric motor generating an initial load of kinetic energy and the alternator for transferring at least a part of the initial load of kinetic energy to the alternator for the purpose of generating electrical energy and for storing the excess kinetic energy inside the second mechanical network.

19. The network as claimed in claim 18 wherein said first and second mechanical networks comprise a rotating shaft and at least one flywheel.

20. The network as claimed in claim 19, wherein said first mechanical network further comprises a pulley apparatus for increasing the rotational speed of the alternator beyond the rotational speed of the rotating shaft.

21. The network as claimed in claim 20, wherein said first electrical network comprises an AC step-up-transformer and an AC stabilizer transformer.

22. The network as claimed in claim 21, wherein said second electrical network comprises a DC AVR Transformer and a DC rectifier transformer.

23. The network as claimed in claim 22, wherein said first and second electrical networks comprise an electrical control panel comprising a microprocessor or microcontroller.

24. The network as claimed in claim 23, where the amounts of said first, second and third portions of electrical energy are determined by said electrical control panel.

25. The network as claimed in claim 24, wherein said first and second electrical networks comprise a voltmeter and an RPM meter for respectively monitoring the power of electrical energy generated by the alternator and rotational speed of said rotating shaft.

26. The network as claimed in claim 25, wherein said at least one flywheel are three flywheels, where each one of the three flywheels has a mass concentration approximate the in a predefined zone within its surface such that the net torque required for maintaining the rotation of the three flywheels when combined with a constant angular velocity about the longitudinal axis of the rotating shaft is null.

27. A closed-loop electrical energy regeneration method comprising:
in a first cycle:
using an electric motor for generating kinetic energy;
using at least a part of the kinetic energy for generating electrical energy using an alternator;
storing the excess kinetic energy for use in subsequent cycles if required;
using a first portion of the electrical energy generated by the alternator for operating an electrical power system; and
in subsequent cycles:
repeating the above steps of the first cycle using a second portion of the electrical energy generated by the alternator in the first cycle for feeding the electric motor.

28. The method as claimed in claim 27 further comprising:
using a third portion of the electrical energy generated by the alternator for storage at an electrical energy storage device, the amount of the third portion being the difference between the total amount of electrical energy generated by the alternator and the sum of the first and second portions.

29. The method as claimed in claim 28 further comprising:
monitoring the amount of electrical energy generated by the alternator and the excess amount of the kinetic energy stored;
wherein the ratio between the first and second portions of the electrical energy is determined at each cycle based on the amount of power required to operate the electrical power system, the monitored amount of electrical energy generated by the alternator and the stored excess amount of kinetic energy.

30. The method as claimed in claim 29, further comprising:
in the first and subsequent cycles, using the electrical energy stored in the electrical energy storage device for feeding up the electric motor if required.

* * * * *